Figure 1:
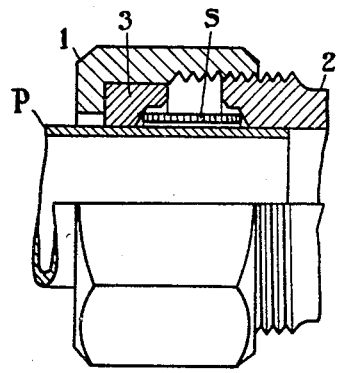

May 8, 1934.  B. N. R. LAMONT  1,957,605
PIPE COUPLING
Filed Jan. 25, 1932   2 Sheets-Sheet 1

Inventor
Boyd Neil Robert Lamont
By
Stone, Boyden, Mack & Hahn
Attorneys

May 8, 1934.  B. N. R. LAMONT  1,957,605

PIPE COUPLING

Filed Jan. 25, 1932   2 Sheets-Sheet 2

Inventor
Boyd Neil Robert Lamont.
By
Stone, Boyden, Mack & Hahn.
Attorneys.

Patented May 8, 1934

1,957,605

UNITED STATES PATENT OFFICE 1,957,605

PIPE COUPLING

Boyd Neil Robert Lamont, Surbiton, England, assignor to Simplifix Patents Ltd., Surbiton, England, a company of Great Britain Application January 25, 1932, Serial No. 588,775
In Great Britain February 7, 1931

18 Claims. (Cl. 285—120)

This invention relates to couplings for pipes, tubes, rods, and the like, of the kind in which a sleeve applied to the external surface of an element to be coupled is compressed between a pair of coupling members adapted to be drawn axially together by means of screw threads or the like.

An object of the invention is the provision of improved coupling devices of the character indicated. Other objects of the invention consist in the provision of improved combinations, sub-combinations and constructional features, all as will be more fully set forth hereinafter.

In one specific form, the sleeve is of a material (such as a strong ductile metal having a relatively high elastic limit and yield point) such as will permit it being buckled from its initial form (which may be a straight cylindrical tube) into a shape which is channel-shaped in cross-section having sides flaring inwardly for engagement with the pipe or other cylindrical element to be coupled, when compressed axially by the relative axial movement of the coupling members, and that with little appreciable increase in thickness. The two coupling, or constraining members, when tightened, have surfaces which press against the ends of the sleeve, these surfaces preferably being chamfered to force the end portions of the sleeve, by cam-action, against the pipe or bar, or the like. One, or preferably both of these coupling members also preferably have surfaces which surround and overhang portions of the sleeve, against which the sleeve when buckled is pressed. In the construction which is now preferred the overhanging portions of the two coupling members are provided with shoulders, against which the exterior of the sleeve, when buckled, is forced, in zones intermediate the ends and the central section of the sleeve, the "crown" of the channel-shaped section of the sleeve being free to expand further, radially, between the overhanging portions of the two coupling members. By this means the end portions of the sleeve are pressed more tightly against the pipe or bar, and annular chambers, which may be fluid-tight, are formed between the pipe or bar and the interior surface of the sleeve, and between the exterior surface of the sleeve and the overhanging portions of the coupling members, one or both.

The characteristic feature to be noted in connection with the couplings according to this invention is that, in addition to the sealing contact formed between the ends of the sleeve and the constraining members, one or more additional zones of sealing contact are formed between one or each constraining member and the sleeve along that part of the outer surface of the latter lying between the sleeve end adjacent the constraining member and the sleeve's central peripheral portion, combined with the feature that this central portion lies, in the tightened-up coupling, in a free space between and out of contact with the constraining surfaces of the two constraining members. By means of this novel combination, a number of separate sealing contacts are formed between the sleeve, the constraining members and the element (pipe or the like), all of which contacts are of small area so as to form, in the aggregate, a multiplicity of seals which thereby form a perfectly leakproof joint. The fact that the central peripheral portion of the sleeve is free to expand radially ensures that perfect seals are always formed at the zones of contact abovementioned. With the couplings according to the invention, a perfectly fluid-tight joint is obtainable without any preliminary treatment (such as belling, screw-threading, etc.) of the pipe, beyond cutting to the required length, if necessary.

One of the constraining members will usually be a loose gland ring having its end remote from the sleeve engaging with the union nut or flange member, as the case may be, used to effect the axial movement. The other constraining member may be incorporated with the part itself to which the pipe, tube or bar is to be coupled. But here again, a loose gland ring may be interposed between said part and the end of the sleeve, as and for the purposes described hereinafter. The ring is loose in the sense that it is free to slide on the pipe before being clamped.

Couplings according to the present invention can be applied to pipes of all sizes in which fluid-tight joints are essential, for example, from petrol supply pipes to water mains of the largest size. They can also be applied to structures made up of round steel tubes or bars, such as scaffolding, wherein ease of erecting and dismantling the structure and firmness of clamping of the couplings are the essential requisites, since simple spanners only are required for assembling or dismantling the couplings. Tubes, bars, couplings and their sleeves which have been used in a dismantled structure can be again used in another structure, provided the tubes or bars are sufficiently smooth-surfaced to permit of removal of the sleeves without damaging either the sleeves or tubes. When so used again, obviously the sleeves, in their new application, are preformed into the channel-shaped section.

The material of which the sleeve is made in any particular application is preferably the same as, or of similar nature to, that of the pipe or other article with which the coupling is to be used. For example with a copper pipe a copper sleeve is preferably used and with a steel pipe or bar a sleeve of thin mild steel is preferably used. By this means, danger of galvanic action being set up is avoided.

Figure 2:
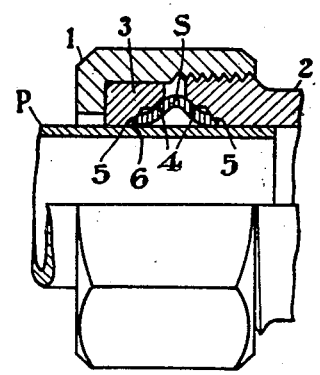
Figure 3:
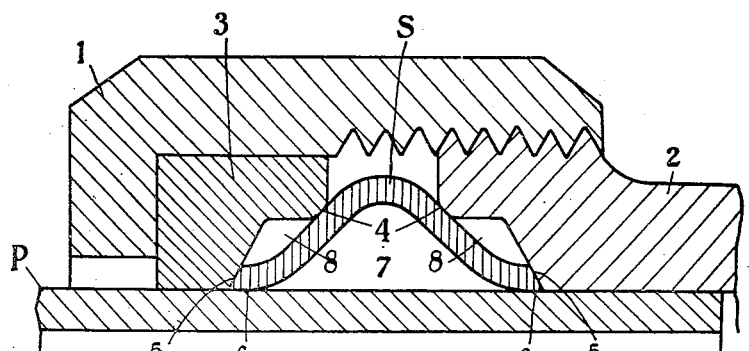
Figure 7:
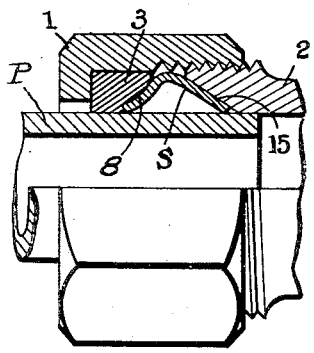
Figure 8:
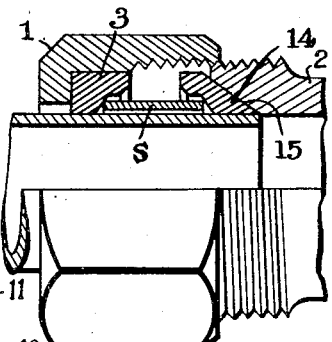
Figure 5:
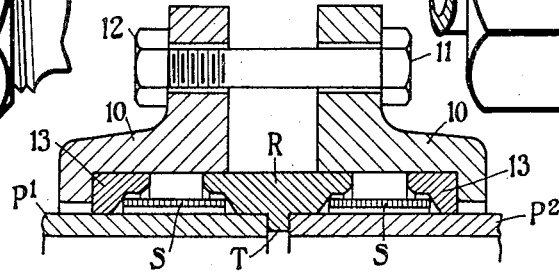
Figure 9:
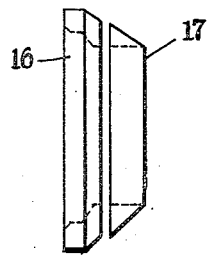
Figure 6:
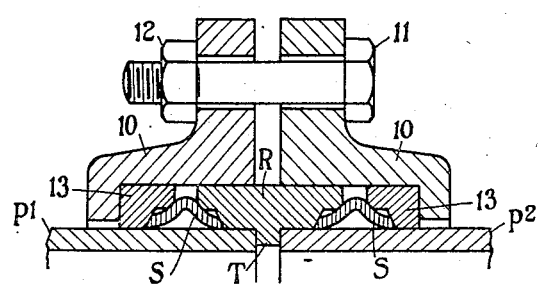
Figure 10:
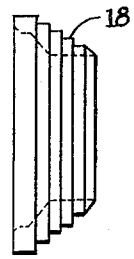

In order that the invention may be more clearly understood, attention is directed to the accompanying drawings, illustrating certain embodiments of the invention, in which Figure 1 is a longitudinal half-section of a coupling between the end of a pipe and a cock, valve body or the like fitting. The parts of the coupling in this figure are shown in the loosely assembled position with the sleeve initially in the form of a cylinder, while in Figure 2 the same parts are shown in longitudinal half-section in the tightly assembled position when the coupling is made, Figure 3 is a detailed view of the sectioned portion in Figure 2 and is intended to illustrate the mode of action of the coupling in securing firmness of clamping and a fluid-tight joint, Figure 4 is a sectional view of part of a coupling similar to that of Figure 3 but having a modified form of the constraining members, Figures 5 and 6 are sectional views illustrating in the loosely and tightly assembled positions respectively part of a coupling for coupling together end to end two aligned pipes of large diameter, such as water mains or the like, Figure 7 is a longitudinal half-section of a coupling similar to that of Figure 1 for coupling the end of a pipe to an existing fitting, Figure 8 illustrates in part section a modified form of the coupling of Figure 7, Figures 9 and 10 illustrate two modifications of a detail in Figure 8.

Figure 1 illustrates a small coupling of the screw union type as applied to a comparatively hard pipe P, such as copper, before tightening up the coupling members consisting of the coupling nut 1 and externally threaded socket member 2. The member 2 acting as a constraining member, and the gland constraining ring 3, are provided, as shown in Fig. 3, each with a shoulder 4 and an internal abutment 5 which are so arranged that when the constraining members 2 and 3 are drawn together the sleeve S is buckled in the manner illustrated in Figure 2 and shown in greater detail in Figure 3. The first effect on screwing together the members 2 and 3 by turning the union nut 1 is to force the ends of the sleeve S radially inwards against the pipe P at the zones 6. This starts an incipient buckling of the sleeve S which then makes contact with the shoulders 4, and on still further screwing together the members 2 and 3 to complete the fastening, the sleeve is buckled into a shape somewhat as shown in Figure 3, the pressure exerted by it at the zones 4 and 6 being gradually increased as the buckling proceeds.

In this way are formed an air chamber 7 between the sleeve and the pipe which is effectively sealed at the zones 6, and two smaller chambers 8 between the sleeve and the constraining members which are effectively sealed at the zones 4 and 5. This coupling is eminently suitable in cases where the pipe P conveys liquid, and is particularly effective for preventing any tendency to "creep" which the liquid may possess. Petrol is a liquid having such a property and it has been found that in petrol unions embodying the present invention, the airlocks above referred to form an effective barrier to "creeping".

Figure 4:
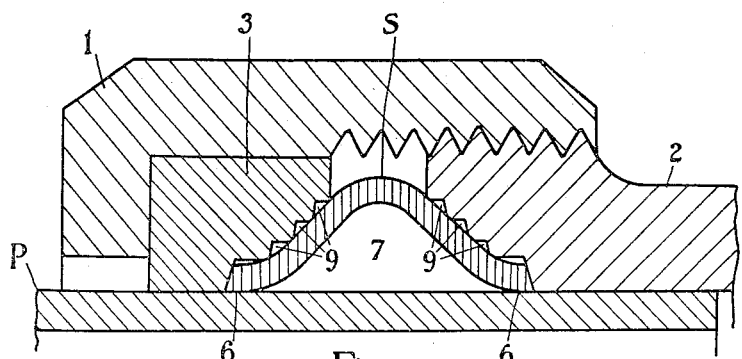

Figure 4 shows a modification of the members 2 and 3, in which the internal surfaces have been stepped by means of a suitable boring tool, so that when the sleeve is forced into contact therewith a plurality of sealed air chambers 9 are formed, thereby increasing the resistance to "creeping" of the petrol or other liquid.

In Figure 5, a coupling between two pipes of large diameter is shown in section in loosely assembled position. The sleeves S are provided one on each of the pipes $P_1$ and $P_2$ on which loose flange members 10 and gland rings 13 are positioned, said members being drawn together by bolts 11 and nuts 12 in the usual manner. A ring R is positioned between the sleeves and is provided with an internal flange T against which the pipe ends abut. The faces of the ring R and the gland rings 13 which abut against the sleeves are shaped as hereinbefore described so as to produce the desired buckling of the sleeves on axial movement of the constraining members or rings 13 when the nuts and bolts are tightened.

Figure 6 shows the coupling in Figure 5 when the joint is made. The ring R and flange T serve to maintain the axial alignment of the pipes and the centering of the constraining members during tightening. The internal flange T may be omitted in the case of water mains buried in the soil, in order to facilitate the replacement of a length of pipe in the event of a breakage. The nuts 12 having been slackened off, the whole coupling assemblage at each end of the broken pipe can be slid bodily axially along the unbroken pipe thereat clear of the broken pipe, which can then be removed without disturbing the unbroken pipe.

In the foregoing description with reference to Figures 1 to 6, it has been presumed that each of the constraining members abutting against the ends of the sleeve is shaped in the special manner described and illustrated. However, the invention can be applied directly to any ordinary fitting having a conical seating. An embodiment is illustrated in Figure 7 which shows in the tightly assembled position a coupling between the end of a pipe P and an existing fitting, such as a cock, valve body, or the like. The parts of the coupling are similar to those bearing the same reference characters in the preceding figures. It is to be noted in this arrangement that due to the unrecessed nature of the seating 15 of the member 2, no air chamber is formed between the latter and the sleeve which is forced hard against the member 2, contact taking place over the surface of the seating. An air chamber 8 is formed between the constraining gland ring 3 and the sleeve S as before.

Although the invention may be applied directly to an existing fitting in the manner indicated, it is preferred to provide a loose adaptor member between the existing fitting and the sleeve, which member has one face shaped as herein defined for co-operating with the sleeve, its other face being shaped in accordance with the seating of the fitting in question.

As an illustration, reference may be made to the type of union commonly employed in petrol and oil pipes, in which a male cone collar soldered or otherwise permanently secured at the end of a section of pipe is tightly pressed against a female cone seating on the union member by means of a nut loosely mounted on the pipe and co-operating with a screw thread on the union member. A coupling according to the present invention is embodied in such a union in the manner illustrated in Figure 8. A plain-ended section of pipe P is substituted for the collared pipe and is provided at its end with a loose gland ring or member 14 having one end shaped as a male cone for engaging the seating 15 of the union and having its opposite end shaped to function as the constraining member co-operating with the sleeve S encircling the pipe.

When it is essential that the joint at the seating 15 of the existing fitting be fluid-tight, that part of the gland member which engages the seating of the fitting should be deformable, either permanently or temporarily, to an extent sufficient to enable it to enter into intimate contact with the seating throughout the whole of the contact area when the union is tightened, so as thereby to compensate for any inaccuracies in the parts of the fitting, and, in extreme cases, for actual misfitting of the parts. For this purpose, the gland member may consist of two separate parts 16 and 17, as shown in Figure 9.

Such a compound gland member offers the advantage that the separate parts from which it is assembled may be composed of materials having differing qualities. For instance, the gland with special shaping for the sleeve is preferably of hard, rigid metal, while the gland to be seated in the fitting may be of permanently or temporarily deformable material so as to be forced into intimate contact with the seating when the union nut is tightened up. This latter gland may consist of metal tempered to render it resilient or may be composed of a ductile metal such as lead; or again it may be composed of rubber or other similarily resilient material.

In the preferred form, however, to ensure that the joint is fluid-tight the gland member 14 is stepped or serrated on its face 18 which engages with the seating, as shown in Figure 10. By this means, the initial contact area between gland and seating is reduced to almost vanishing point, and on screwing up the coupling nut ridges of the gland are forced into the surface of the seating, producing slight deformation of both gland and seating, until the contact area is sufficient to withstand the pressure applied. A number of minute sealed annular chambers similar to the chambers shown in Figure 4 are thereby formed, and the joint is fluid-tight.

The sleeve should be of hard metal preferably of the same metal as or metal of a similar nature to the article with which the coupling is to be used, but should be of a softer variety of metal than that of which the pipe or rod is formed. For example, for joining copper pipes employing a copper sleeve, when the pipe is of solid drawn copper the sleeve or sleeves are of soft annealed copper. In the case of a brass pipe or rod a brass sleeve preferably is used, and in the case of an iron pipe preferably a malleable iron sleeve is used, but sleeves of soft annealed mild steel, copper and aluminium can also be used with iron pipes if the effects of electrolysis can be disregarded. In this way, the fluid-tight seal between the sleeve and the pipe is made without deforming or distorting the latter. By thus making the seal without keying the sleeve on to the pipe the sleeve can be removed from the pipe and used again, when the coupling is undone. The inherent springiness of the sleeve causes it to become looser on the pipe and thus facilitates removal, when the coupling members are slackened off.

The invention is also applicable to joints and couplings for pipes and rods of steel, aluminium and various commercial alloys.

Finally, the couplings according to the invention may be employed in all known types of joint, for example, in bent and T connections, swivel joints, etc.

I claim:

1. Pipe coupling comprising a substantially cylindrical deformable metal sleeve adapted to surround the pipe to be coupled, sleeve compressing members, one at each end thereof and means for drawing said members together axially with the sleeve ends compressed and contracted onto the pipe and also with an outward expansion of the sleeve intermediate its ends, each compressing member being shaped to contact with the adjacent sleeve end and with a separated zone of the expanded portion thereof.

2. Pipe coupling comprising a substantially cylindrical deformable metal sleeve adapted to surround the pipe to be coupled, sleeve compressing members, one at each end thereof, a separate compressing ring positioned between one of said members and the adjacent sleeve end, and means for drawing said members together axially with the sleeve ends compressed and contracted onto the pipe and also with an outward expansion of the sleeve intermediate its ends, said ring and the compressing member remote therefrom each being shaped to contact with the adjacent sleeve end and with a separated zone of the expanded portion thereof.

3. Pipe coupling according to claim 2, characterized in that the said ring is constructed to make a fluid-tight joint with the coupling member adjacent it.

4. Pipe coupling comprising a sleeve of deformable material surrounding the pipe, sleeve compressing members, one at each end thereof and means for drawing said members together axially with the sleeve ends compressed and contracted onto the pipe and also with an outward expansion of the sleeve intermediate its ends, each compressing member having an annular surface adapted to contact with the adjacent sleeve end and having another, distinct, annular surface for contact with the expanded portion of the sleeve.

5. In a pipe joint, the combination with a pipe, of a substantially cylindrical deformable sealing sleeve of softer metal than the pipe, adapted to surround the latter, sleeve compressing members, one at each end thereof and means for drawing said members together axially with the sleeve ends compressed and contracted onto the pipe and also with an outward expansion of the sleeve intermediate its ends, each compressing member being shaped to contact with the adjacent sleeve end and with a separated zone of the expanded portion thereof, said sleeve, when the joint is made, being tightly sealed on the pipe in keyless relation.

6. A coupling for a plain-ended pipe, comprising a substantially cylindrical deformable short metal sleeve adapted to fit the pipe to be coupled, sleeve compressing members, one at each end thereof, each being provided with a portion overhanging the sleeve but spaced away from it, and with a chamfered surface, directed towards the pipe adjacent the sleeve end and adapted to contact therewith, and means for drawing said members together axially so that it is compressed and the sleeve ends contracted onto the pipe and also an outward expansion of the sleeve created intermediate its ends so that the expanded portion thereof presses against said overhanging portions of the compressing members.

7. A coupling device for pipes, rods and like cylindrical elements, comprising in combination, a sleeve of material adapted to buckle when compressed axially, adapted for mounting upon an element to be coupled, constraining members adapted for mounting upon said element adjacent the opposite ends of said sleeve, and means for drawing said members axially together, said members having surfaces positioned to engage the ends of said sleeve and form abutments therefor and at least one of said members having also at least one shoulder thereby to provide at least one seating for at least one zone of the sleeve outer surface between an end and the central peripheral portion thereof, the said central portion lying out of contact with the said members.

8. A coupling device for pipes, rods and like cylindrical elements, comprising in combination, a sleeve of material adapted to buckle when compressed axially, adapted for mounting upon an element to be coupled, constraining members adapted for mounting upon said element adjacent the opposite ends of said sleeve, and means for drawing said members axially together, said members each having a surface positioned to engage an end of said sleeve and form an abutment therefor and said members each being provided also with a plurality of shoulders thereby to provide a plurality of seatings for zones of said sleeve lying between the ends and central peripheral portion thereof, the said central portion being out of contact with the said members.

9. A coupling device for pipes, rods and like cylindrical elements, comprising in combination with an element to be coupled, a sleeve adapted for mounting upon said element and being channel-shaped in cross-section with its sides flaring inwardly for engagement with said element, constraining members mounted on said element adjacent the opposite ends of said sleeve, and means for drawing said members axially together, said members each having a surface positioned to engage the adjacent end of said sleeve and form an abutment therefor and having overhanging portions separated from each other in the axial direction, at least one of which is provided with at least one annular ridge positioned for engaging with and forming a seating for a zone of the flared outer surface of said sleeve situated between an end and the central peripheral portion thereof, the said central portion lying between the out of contact with said overhanging portions of said members.

10. A coupling device for pipes, rods and like cylindrical elements, comprising in combination with an element to be coupled, a sleeve mounted on said element and being channel-shaped in cross-section with its sides flaring inwardly for engagement with said element, a pair of constraining members mounted on said element and abutting against the opposite flaring sides of said sleeve with overhanging portions separated from each other in the axial direction, each of said overhanging portions having a plurality of annular ridges positioned for engaging with and forming a plurality of seatings for a plurality of zones of the flared outer surface of said sleeve situated between the ends and central peripheral portion thereof, the said central portion lying in the space between and out of contact with the separated overhanging portions of said constraining members.

11. A coupling device for pipes, rods and like cylindrical elements, comprising the combination with a pair of elements to be coupled, of a tubular ring surrounding the adjacent ends of said elements, a sleeve mounted on each element adjacent said ring, a constraining member mounted on each element adjacent the outer end of its associated sleeve, said ring and each member each having the surface adjacent a sleeve shaped with an abutment for the end thereof and also with an overhanging portion adapted for engaging the sleeve at at least one zone intermediate the said end and central portion of the said sleeve, the said central portion lying, in the tightened-up coupling, between and out of contact with said members, and means for drawing said constraining members towards said ring.

12. A coupling device for pipes, rods and like cylindrical elements, comprising the combination with a pair of aligned elements to be coupled, of a tubular ring surrounding the adjacent ends of the elements and having an internal flange against which the ends of the elements are seated, a sleeve mounted on each element adjacent said ring and being channel-shaped in cross-section with its sides flaring inwardly for engagement with its associated element, a constraining member mounted on each element adjacent the outer end of the associated sleeve, the surfaces of said ring and constraining member associated with each sleeve being shaped to abut against the opposite flaring sides of said sleeve, and having overhanging portions separated from each other in the axial direction adapted to engage said sleeve at a plurality of zones separated in the axial direction along said flaring sides of said sleeve, said sleeve having a central peripheral portion lying in the space between said separated overhanging portions of said constraining member and ring and out of contact therewith, and means for drawing one of said constraining members axially towards the other.

13. A coupling device for pipes, rods and the like cylindrical elements, comprising the combination of an externally threaded socket member, a cylindrical element extending into said member, a metal sleeve mounted on said cylindrical element and being channel-shaped in cross-section with flaring sides extending inwardly from a central peripheral portion for engagement with said element, a ring interposed between said socket member and the adjacent, inner, end of said sleeve, and a coupling nut mounted on said socket member and having a shoulder to engage the outer end of said sleeve, said ring and nut each being shaped to engage the ends of the sleeve and press said ends into engagement with said cylindrical element and also each being counterbored to form at least one ridge for engagement with a zone of a flaring side of said sleeve intermediate the end and said central peripheral portion thereof, the parts being so proportioned that in the tightened-up position of the coupling said ring and coupling nut enclose a free space in which lies said central peripheral portion of said sleeve, said ring further having its surface adjacent said socket member shaped to engage said member and make a joint therewith.

14. A coupling device as defined by claim 13, in which the said ring has its surface adjacent the said socket member serrated circumferentially to provide a plurality of ridges for engaging said socket member and making a joint therewith.

15. A coupling device according to claim 13, characterized in that a second ring is interposed between the coupling nut and sleeve and is engaged by said nut.

16. A coupling device for plain-ended pipes and like cylindrical elements, comprising in combination with a cylindrical element to be coupled, a short plain cylindrical metal sleeve of substantially uniform thickness throughout and mounted on said element, constraining members mounted on said element adjacent the opposite ends of said sleeve, each of said members being provided with an abutment for the adjacent end of said sleeve for pressing said sleeve into sealing contact with said abutment and said element, each constraining member also having a cut-away portion overhanging a zone of said sleeve and spaced away therefrom, said cut-away portion comprising at least one ridge adapted to form a seating for a zone of said sleeve intermediate its end adjacent said member and its central portion, and means for drawing said constraining members axially together, the parts being proportioned such that when the coupling is tightened, said constraining members are separated axially and partially enclose a free space into which said sleeve when buckled is forced, said sleeve in its buckled position making sealing contact with said constraining members at zones of its outer surface intermediate its ends and central buckled portion, said zones being formed by contact of said sleeve with said ridges of said constraining members.

17. A coupling device for pipes, rods and the like cylindrical elements, comprising in combination, a sleeve of deformable material, coupling members at opposite ends of said sleeve, a constraining ring positioned between one of said coupling members and the adjacent sleeve end, said sleeve, coupling members and ring all being bored to receive the element to be coupled, and means for drawing said coupling members axially together, said ring and the coupling member remote therefrom each having a surface positioned to abut against the adjacent sleeve end and each having also at least one internal annular ridge forming a seating for a zone of the sleeve outer surface between the adjacent end and the central peripheral portion thereof, the said central portion lying between and out of contact with the said ring and coupling member.

18. A coupling device according to claim 17, characterized in that the ring is arranged to engage the coupling member adjacent it and make a fluid-tight joint therewith.

BOYD NEIL ROBERT LAMONT.